June 7, 1949.  R. L. BATES  2,472,273
APPARATUS FOR PRODUCTION OF RELIEF SURFACES
Filed Sept. 14, 1945  2 Sheets-Sheet 1
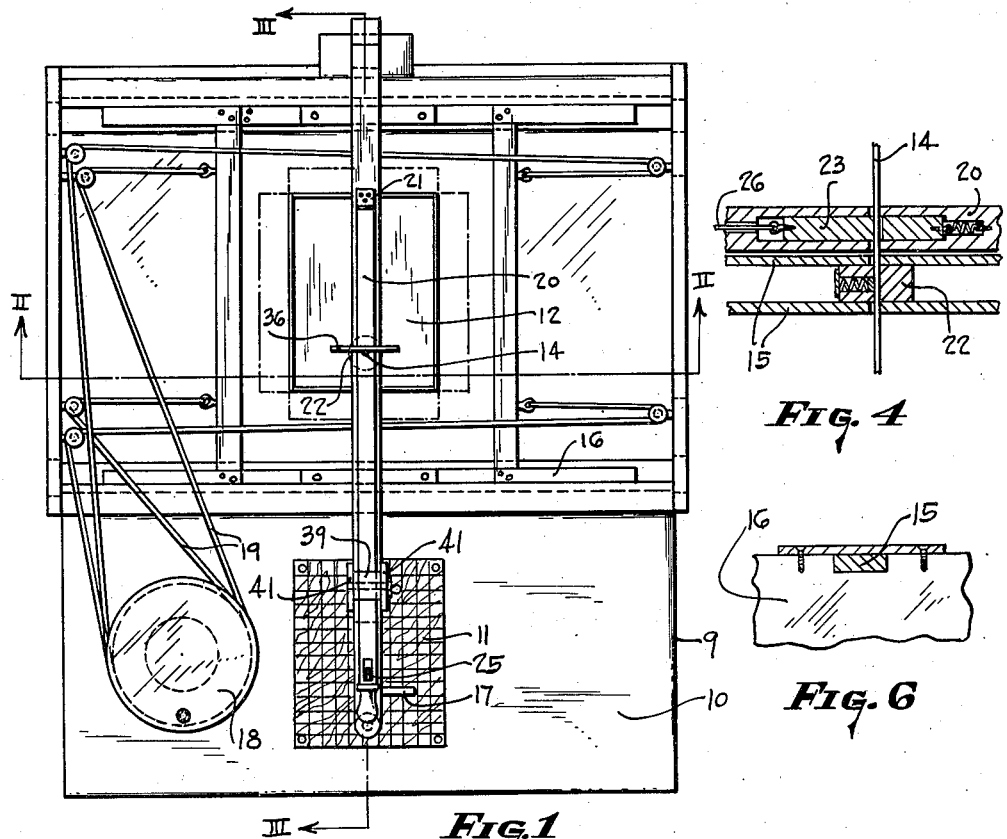
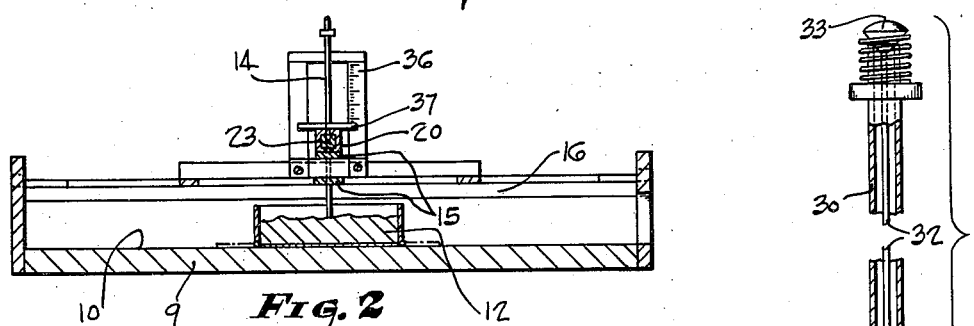
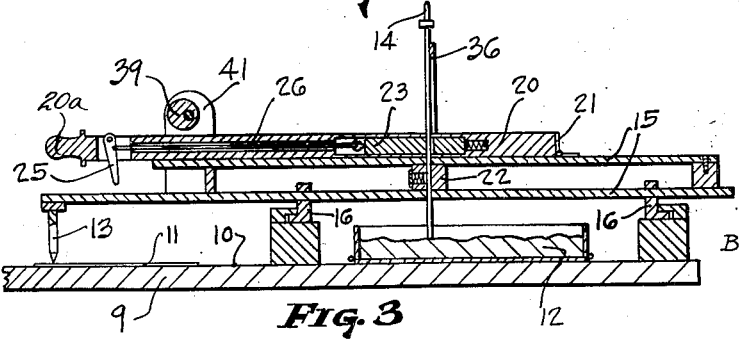
INVENTOR.
ROBERT L. BATES
BY
ATTORNEY.

June 7, 1949.  R. L. BATES  2,472,273
APPARATUS FOR PRODUCTION OF RELIEF SURFACES
Filed Sept. 14, 1945  2 Sheets-Sheet 2
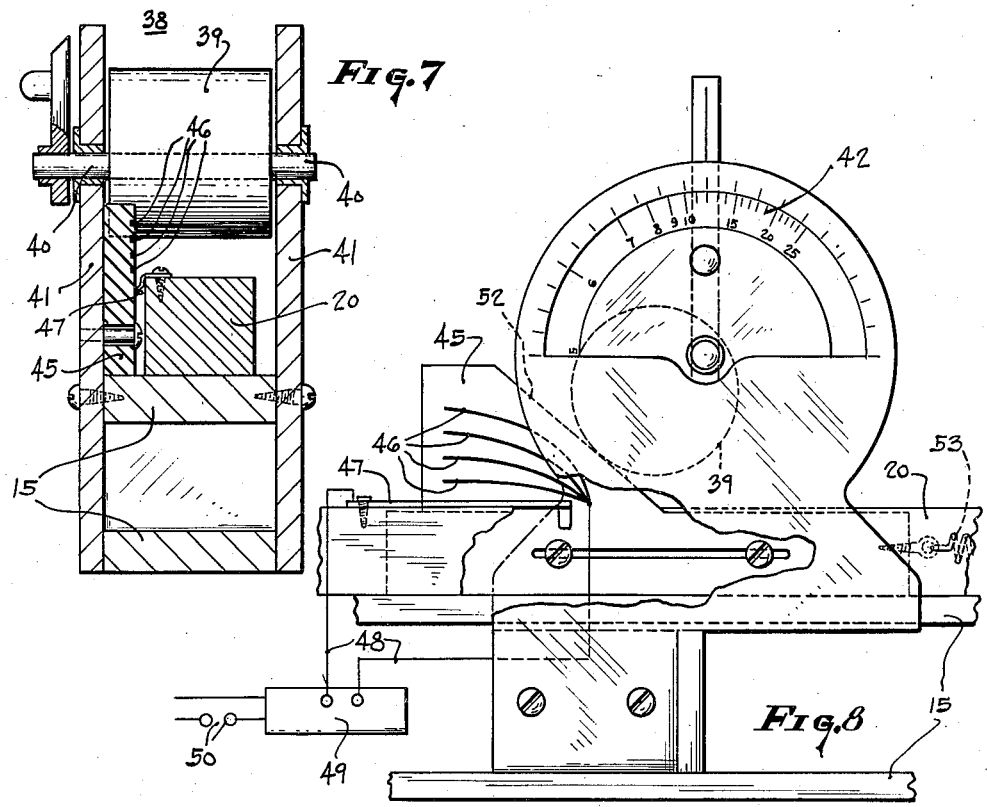
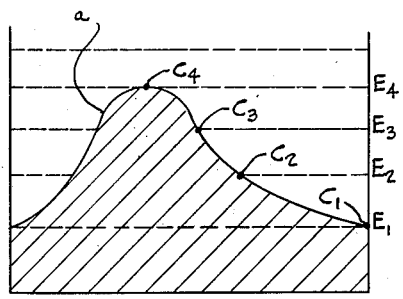
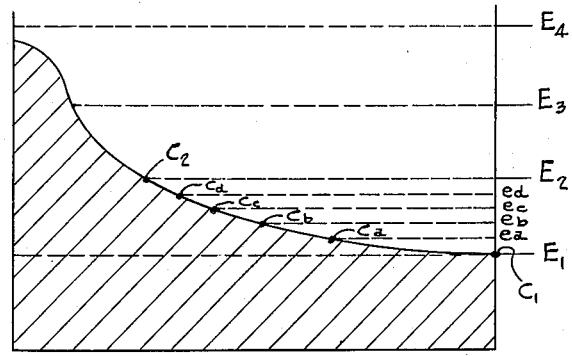
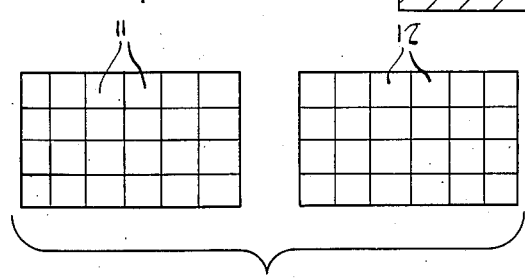
INVENTOR.
ROBERT L. BATES.
BY
ATTORNEY.

Patented June 7, 1949

2,472,273

UNITED STATES PATENT OFFICE 2,472,273

APPARATUS FOR PRODUCTION OF RELIEF SURFACES

Robert L. Bates, Lexington, Va.

Application September 14, 1945, Serial No. 616,321

8 Claims. (Cl. 41—1)

The invention relates to production of a relief or three-dimensional surface on a body and it has for an object to develop such a surface by a tool controlled by three-dimensional movements, including a pair of crosswise movements and a movement at right angles to the latter, applied thereto by a stylus moved crosswise of a two-dimensional pattern surface, of equal and similar area to the projected area of the three-dimensional surface, to scan the pattern surface and applied directly thereto in accordance with contour lines provided on the pattern surface and representative of elevation of the three-dimensional surface.

A further object of the invention is to provide apparatus of the above character to develop a relief map in plastic material by having the stylus scan a topographic map or a contoured representation thereof and by adjusting the developing or working tool in accordance with contour lines of the topographic map, the tool being fed, at right angles to the crosswise movements for scanning, a distance dependent upon the elevation difference of adjacent contour lines while the stylus traverses from one contour line to the next.

A contour or relief surface is a three-dimensional one and it may be regarded as being defined by an infinite number of points of variable elevation with respect to its projected area. Now, if a two-dimensional pattern surface has the same area and shape as the projected area and is provided with indications of elevation of a suitable number of distributed points in the desired three-dimensional surface, then the crosswise movements required to scan the pattern surface by a stylus may be applied to a tool while the latter is fed at right angles to the crosswise movements, whereby there is given to the tool the necessary three-degree movement for shaping or removing material of a body to develop thereon the relief or contour surface called for by the pattern surface. In accordance with the present invention, there is provided a pattern surface having contour or elevation indications, a body upon which is to be formed a relief surface as determined by the pattern surface, a tool for removing material from the body, a stylus manually movable crosswise of the pattern surface to scan the latter and operatively connected to the tool to effect similar movements thereof with respect to the body, and means for manually feeding the tool at right angles to the crosswise movements while the pattern surface is being scanned by the stylus and in accordance with the elevation indications of such pattern surface. More particularly, the invention has to do with employing apparatus of this character in the production of a relief map from modeling clay by the use of a topographic map, the map being scanned by a stylus and the tool being fed in increments, each of which, for the map scale, is proportional to the elevation difference between adjacent contour lines of the topographic map and each increment occurring while the stylus is being traversed from one contour line to the next.

As it is usually necessary to enlarge a topographic map to obtain a relief map of desired dimensions, before enlargement, the topographic map is divided into like rectangular sections, each of which is enlarged to the same extent, each enlarged section being hereinafter referred to as "map section." With a body of plastic material or modeling clay of the same crosswise dimensions as a map section and the latter and the body being mounted in coordinate relation on the table of the apparatus, the stylus and the tool are supported from the table by means, including a slide and a cross slide, providing the proper crosswise movements of the stylus with respect to the map section and of the tool with respect to the section of modeling clay or plastic material. The tool operates to provide for removal or shaping the section of clay to enable the formation of the desired relief surface.

Scanning of the map section is preferably effected by traversing the stylus lengthwise thereof, with widthwise movements given to the stylus between successive traverses, scanning beginning at one side of the map section and progressing to the opposite side. Such scanning, therefore, consists of a series of parallel traverses of the stylus covering the map section. As the tool traverses the clay or model section, it is fed incrementally in accordance with the elevation difference between adjacent contour lines, an increment of feeding occurring while the tool passes from one contour line to the next.

Any unevenness or stepped appearance of the relief or contour surface of the model section resulting from traversal of the tool in the above manner may be averaged out by smoothing down with a moistened brush or by hand.

After parallel traverse scanning, the map section may be scanned by traversing each contour line, the tool, with its cutting point removed, being fed in or out as required by the elevation of contour lines passed over, to check the relief surface and to indicate the extent of needed corrections. Also, roadways and streams may be indicated on the clay section by moving the stylus along indications thereof on the map section, the tool being adjusted for changes in elevation. As the relief map sections are completed, they are assembled in proper order on a horizontal supporting surface, any unevenness at joints being smoothed out. With the relief map sections assembled, any suitable surface treatment may be applied.

A further object of the invention is to use the above apparatus and procedure to produce a relief map made up of assembled rectangular sections.

A further object of the invention is to provide apparatus for producing a relief map by following the above procedure and wherein the elevation feed is adjusted to secure relief map elevation which is undistorted or distorted to a desired extent in relation to scale of the map section.

Yet another object of the invention is to provide for audible indication of traversal by the tool of equal parts of feed increment corresponding to the elevation difference of adjacent contour lines of the map section to guide the operator in moving the stylus from one contour line to the next while feeding the tool through an increment.

These and other objects are effected by the invention as will be apparent from the following description and claims taken in connection with the accompanying drawings, forming a part of this application, in which:

Fig. 1 is a plan view of apparatus used to form relief map sections by the use of topographic map sections;

Fig. 2 is a transverse sectional view taken along the line II—II of Fig. 1;

Fig. 3 is a longitudinal sectional view taken along the line III—III of Fig. 1;

Fig. 4 is a detail view showing the tool and the associated gripping and clutching device;

Fig. 5 is a detail view showing the tool and its point;

Fig. 6 is a detail view of means for fixing the tool elevation feed increment;

Figs. 7 and 8 show a modified form of lever stroke adjusting means equipped with means signaling division of a feed increment;

Fig. 9 is a diagram representing a longitudinal traverse by the tool;

Fig. 10 is an enlargement of a portion of Fig. 9 to aid in an understanding of the operation of the apparatus of Figs. 7 and 8; and Fig. 11 represents diagrammatically a sectionalized topographic map in juxtaposed relation to a relief map made up of sections corresponding to the map sections.

The apparatus shown in the drawing comprises a table 9 having a horizontal surface 10 upon which are mounted a two-dimensional topographic map, having contour lines or indications, and a body 12 of suitable material. A stylus 13 and a tool 14 are mounted on the table for crosswise movements relative to the pattern or map and the body. Also, the tool is adjustable in a direction at right angles to the crosswise movements. Therefore, if the pattern surface or map is scanned by the stylus and if, while the stylus is passing from one contour line to the next of the map, the tool is given an increment of feed corresponding to the elevation difference between adjacent contour lines, the desired three-dimensional or relief surface may thereby be formed or developed.

For a relief map of desired dimensions, it is usually necessary to enlarge the available topographic map. Before enlargement, the map is cut into rectangular sections and each section is enlarged to an equal extent and suitably for rectangular sections of modeling clay or plastic material. Such an enlarged section or representation of the map is the map section 11 shown and herein referred to as "map section." The body 12 is shown as comprising a rectangular section of modeling clay or plastic material, and referred to herein as the "model section." Fig. 11 shows map sections assembled to constitute the topographic map in juxtaposed relation with respect to an assembly of corresponding model sections.

The stylus 13 and the tool are connected to a slide 15 carried by the H frame cross slide 16 mounted on the table. The slide 15 is moved lengthwise by any suitable means, for example, by the knob or handle 17. Such lengthwise movements move the stylus with respect to the map section and the tool with respect to the model section. Crosswise movement of the stylus and tool is effected by moving the cross slide in any suitable manner, as by the pulley 18 carried by the table and connected to the cross slide by means of cables 19.

Movements are given to the slide and the cross slide to cause the stylus to scan the map section and the tool is fed vertically, as the stylus moves from one contour line to the next, through an increment, which, for the scale of the map section, is proportional to the elevational difference between adjacent contour lines.

Vertical feed movement is preferably imparted to the tool by means of a lever 20 connected by a hinge or pivot 21 to the upper side of the slide 15 and movable, by means of the handle 20a, upwardly from and downwardly toward the latter. The slide has spring-pressed friction means 22 for gripping the tool to hold the latter vertically. The lever has a spring-pressed friction clutch 23 for engagement with the tool. The force of friction engagement of the clutch is greater than that of the gripping means so that, with the clutch engaged, if the lever is moved, the gripping means is overcome and the tool moves therewith.

The clutch is released by a handle or trigger 25 carried by the lever at its operating end and connected by a link 26 to the clutch. Upon application of force to the trigger, the clutch is released, and, when such force is removed, the clutch automatically re-engages. The tool is moved upwardly and downwardly by upward and downward strokes, respectively, of the lever, the clutch being released to permit the lever to move, free of the tool, from its lower position to its upper position for downward tool feeding and from its upper position to its lower position for upward feeding thereof.

The tool is comprised by a tubular element 30 of small enough outside diameter (about ⅛ inch) to cut, plow through, or slice the portion of the model section to be removed and it carries, at its lower end, a point 31 for undercutting the sliced material and for giving a cut appearance to the relief surface. While the point may be connected to the tubular element in any suitable manner, as shown, it is held in place by a tension member 32 extending upwardly through the bore of the tubular element and connected by means, at 33, disposed at the upper end of the tubular element and effective normally to tension the member 32 to connect the point to the tubular member and operable for detachment of such point.

Preferably the slide 15 is pushed or pulled to effect lengthwise traverses of the stylus and the tool and the cross slide 16 is moved for a suitably small distance between successive lengthwise traverses so that the map section 11 may be scanned by a series of parallel traverses, beginning at one side of the map section and continuing to the other side thereof, the tool being thereby moved to slice material from the model section. As each traverse of the stylus occurs, the tool is fed vertically, as above indicated, to vary the depth of slicing, the lever 20 being moved to impart a feed increment to the tool as the stylus passes from one contour line to the next in each traverse. As the operator is guided by the contour lines in feeding the tool in each slicing traverse, the aggregate of all of the slicing traverses is effective to give relief or contour to the model section.

Fig. 9 is representative of a lengthwise traverse of a model section and wherein the line $a$ indicates an element of the relief surface traced by the lower end of the tool. The ordinate indicates elevation, the points $E_1$, $E_2$, etc., differing successively in a uniform manner, usually by differences of 100 feet for topographic maps. The points $C_1$, $C_2$, etc., indicate contour lines for the elevations $E_1$, $E_2$, etc., of the relief surface. As the tool is traversed lengthwise of a model section, it is given upward feed increments for increasing elevation and downward feed increments for decreasing elevation. To travel from $C_4$ to $C_3$, from $C_3$ to $C_2$, etc., the tool must have horizontal and vertical components of motion applied thereto, the horizontal component being the portion of lengthwise traverse to travel from one contour line to the next and the vertical component corresponding to the elevation between adjacent contour lines. These components are necessarily concurrent to trace the desired surface, that is, the operator, while traversing the tool horizontally from $C_4$ to $C_3$ feeds it vertically from $E_4$ to $E_3$.

A scale 36 is attached to the slide 15 and the tool has a pointer 37 for operating with the scale to continuously indicate to the operator the vertical position of the tool.

A stop or abutment 38 is carried by the slide and it serves to limit the upward movement of the lever, downward movement thereof being limited by the slide to which it is pivoted.

The up and down strokes of the lever should be accurately controlled in amplitude so that the tool feed increment may have a ratio to the map scale to make it possible to produce a relief map having its elevation undistorted or distorted to a desired extent. As an increment of feed occurs while the stylus is traversed from one contour line to the next, it will be apparent that the correlated movements introduce a relation as between feed increment and map scale. Altering the top position of the lever varies the feed increment to vary the distortion ratio. Therefore, the abutment or stop for the lever takes the form of an eccentric 39 having journals 40 mounted in bearings 41 carried by the slide. As the eccentric serves as a limit for the top position of the lever, such top position is varied to vary the lever stroke or amplitude by turning the eccentric. Suitably calibrated indicia 42 for the eccentric indicate the magnitude of the tool feed increment. In this connection, while the pointer 37 moves with the tool and travel of the latter may be observed on the scale 36, it is to be understood that such scale and pointer serve primarily as an elevation gauge by which the operator is enabled to relate, in a desired manner, the variation in elevation with respect to a predetermined base plane so that the contours of all of the model sections for a relief map have elevations taken with respect to the same base plane, with the result that the contours properly match when the model sections are assembled on a horizontal supporting surface.

In Figs. 7 and 8, there is shown an attachment operative to give audible signals of feed travel of the tool over substantially equal parts of a feed increment. As shown, the slide 15 has, slidably mounted thereon, a block of insulating material 45 having a series of fixed contacts 46 secured thereto. The lever 21 has a movable contact 47. An electric circuit 48, including a buzzer, sounder or signal device 49, is arranged to be completed as the movable contact engages each of the fixed contacts incident to movement of the lever. In addition to the contacts, the circuit includes a switch 50 operative to render the signaling arrangement effective or ineffective.

While any suitable number of fixed contacts 46 may be used, as topographic maps usually have contour lines indicating 100-foot elevation differences, I prefer to use four contacts to signal division of the feed increment into five equal parts and, therefore, division of the 100-foot elevation difference into parts of 20 feet each, the outermost of the five parts occurring for travel of the lever between its bottom position and the adjacent fixed contact and between its top position and the fixed contact adjacent thereto.

Therefore, as the lever 21 moves through a stroke, the movable contact 47 engages the fixed contacts 46 in succession to audibly indicate, by a signal, feed travel of the tool over division points corresponding to 20-foot contours for a tool feed increment and for an elevation difference of 100 feet for the lever stroke. The signals guide the operator in distributing the traverse motion of the stylus between one contour line and the next while concurrently moving the lever through a stroke to impart a feed increment.

The signaling attachment is conducive to more accurate development of relief surfaces, particularly where the slope is small and the distance between contour lines is relatively large. On the other hand, where the contour lines are closely spaced, the signals may be disregarded, the circuit switch 50 being opened if desired. Upon becoming habituated to the use of the signaling attachment, not only may accuracy be increased but the work may be more speedily accomplished.

To provide for automatic adjustment of the contacts 46 for operation in the above manner irrespective of the feed increment adjustment for no elevation distortion or elevation distortion in a desired ratio to the map scale, the lever stop eccentric 39A engages an inclined surface 52 formed on the fixed contact insulating supporting block 45, the block being mounted on the slide for guided adjustment lengthwise of the latter. A spring 53 biases the block in one direction to keep the inclined surface in engagement with the eccentric 39. Therefore, as the eccentric is turned, the block is moved lengthwise to move the fixed contacts. The fixed contacts converge and are curved so that, irrespective of lever stroke and feed increment adjustment, division of the tool feed increment into equal parts is audibly indicated.

Fig. 10 is a fragmentary enlargement of Fig. 9 from $C_3$ to $C_2$ and from $C_2$ to $C_1$. Because of the small slope between $C_2$ and $C_1$, there would be advantage in having contour lines of smaller elevation difference, for example, 20 feet, in manually correlating the horizontal and vertical traverse to secure a truer representation of the actual contour of the terrain. Therefore, division of the feed increment, corresponding to 100 feet, into equal parts, for example, five, is audibly indicated by the signals; and, using the signals as a guide and estimating the horizontal distance to be traveled, the operator is better able to distribute the horizontal distance in relation to feed, or to simulate the operation that would occur if the map section were provided with 20-foot contour lines. Where the horizontal travel between contour lines is small, concurrent movements may be effected without regard to the signals. Thus, the signals assist the skill acquired by the operator, enabling him to traverse and feed the tool to develop a relief surface with increased speed and accuracy.

The spacing of the contour lines in a traverse is taken into account by the operator. If closely spaced contour lines precede or succeed widely spaced ones, this would usually signify changing slope between the latter, and the operator would judge as to the probable rate and direction of change of slope in distributing the traverse movement in relation to equal parts of the feed increment in passing between the widely spaced contour lines.

Fig. 11 shows a topographic map comprised by enlarged rectangular sections and the relief map made up of like rectangular model sections in juxtaposed relation to the sectionalized map. After following the foregoing procedure of surfacing the model sections one by one, the latter are assembled, in proper order, touched up where needed at the joints, and the assembly as a whole is given the desired surface treatment.

While the invention has been particularly described in relation to the production of a relief map from plastic material by movement of a tool in three directions, as determined by the two dimensions of a topographic map and the contour indications of the latter, it will be apparent that it is generally applicable where a material-removing tool is moved in three dimensions by means of a stylus, which is moved crosswise of a pattern surface, and by means of feed motion applied directly thereto in accordance with contour or elevation indications on the pattern surface.

While the invention has been shown in several forms, it will be obvious to those skilled in the art that it is not so limited, but is susceptible of various other changes and modifications without departing from the spirit thereof.

Furthermore, it is to be understood the "pattern surface" or "map section," as used herein, has the significance of any means by which contour lines are used by the operator as a guide for feeding the tool while making scanning traverses with the stylus.

What is claimed is:

1. In apparatus utilizing a rectangular section of a topographic map to produce a contour or relief surface on a like model section of plastic material, a table for supporting a map section and a model section in coordinate relation; a slide; a stylus and a tool carried by the slide for cooperation with the map and model sections; said slide being operable to traverse the stylus and the tool lengthwise and horizontally in relation to the map and model sections; a cross slide for the slide, mounted on the table and operable to traverse the stylus and the tool crosswise and horizontally in relation to the map and model sections; means for moving the slide and the cross slide to cause the stylus to scan the map section; means carried by the slide and movable relatively to the latter for imparting to the tool a vertical feed increment while the stylus is traversed from one map section contour line to the next; and adjustable means carried by the slide and cooperating with the last-named means to limit the range of movement of the latter to vary the increment of tool feed occurring from one contour line to the next to provide for development of the relief surface with an elevation scale determined by the feed increment.

2. In apparatus utilizing a topographic map in the formation of a contour or relief surface on a body, a table for supporting the map and the body; a slide; a stylus and a tool carried by the slide for cooperation with the map and the body; said slide being operable to traverse the stylus and the tool lengthwise and horizontally in relation to the map and the body; a cross slide for the slide, mounted on the table, and operable to traverse the stylus and the tool crosswise and horizontally in relation to the map and the body; a lever hinged to the upper side of the slide; gripping means carried by the slide and cooperating with the tool to hold the latter vertically in position; means for clutching the lever to the tool so as to overcome the gripping means, when the lever is moved, to move the tool with the latter; means manually operable to release the clutch means to provide for movement of the lever relative to the tool to position the lever to feed the tool downwardly or upwardly for an increment, for the scale of the map, dependent upon the elevation difference between adjacent contour lines; and means for moving the slide, the cross slide and the lever to move the tool and the stylus together so that the stylus scans the map and, with the lever clutched to the tool, to move the latter through a feed increment while the stylus is moved from one contour line to the next of the map, whereby there is given to the tool the three-dimensional movement required for operation thereof in developing on the body a relief surface in accordance with the map.

3. In apparatus utilizing a rectangular section of a topographic map to produce a contour or relief surface on a like model section of plastic material, a table for supporting a map section and a model section in coordinate relation; a slide; a stylus and a tool carried by the slide for cooperation with the map and model sections; said slide being operable to traverse the stylus and the tool lengthwise and horizontally of the map and model sections; a cross slide for the slide and operable to traverse the stylus and the tool crosswise and horizontally in relation to the map and model sections; a lever hinged to the upper side of the slide; upper and lower stops for limiting the up and down strokes of the lever; gripping means carried by the slide and cooperating with the tool to hold the latter vertically in position; means for clutching the lever to the tool so as to overcome the gripping means, upon movement of the lever, to move the tool with the latter; means manually operable to release the clutch means to provide for movement of the lever relative to the tool to place it in top or bottom position for feeding the tool vertically through an increment which is downward for downstroke motion of the lever and which is upward for upstroke motion thereof and whose magnitude depends upon the lever stroke, as determined by the spacing of the stops; and means for moving the slide, the cross slide, and the lever to move the tool and the stylus together so that the stylus scans the map section by a series of parallel traverses from one side to the other thereof and the tool traverses the model section to slice material therefrom and, with the lever clutched to the tool, to move the latter through a feed increment while the stylus is moved from one contour line to the next in each traverse of the map section.

4. In apparatus utilizing a rectangular section of a topographic map to produce a contour or relief surface on a like model section of plastic material, a table for supporting a map section and a model section in coordinate relation; a slide; a stylus and a tool carried by the slide for cooperation with the map and model sections; said slide being operable to traverse the stylus and the tool lengthwise and horizontally of the map and model sections; a cross slide for the slide and operable to traverse the stylus and the tool crosswise and horizontally in relation to the map and model sections; a lever hinged to the upper side of the slide; upper and lower stops for limiting the up and down strokes of the lever; gripping means carried by the slide and cooperating with the tool to hold the latter vertically in position; means for clutching the lever to the tool so as to overcome the gripping means, upon movement of the lever, to move the tool with the latter; means manually operable to release the clutch means to provide for movement of the lever relative to the tool to place it in top or bottom position for feeding the tool vertically through an increment which is downward for downstroke motion of the lever and which is upward for upstroke motion thereof and whose magnitude depends upon the lever stroke, as determined by the spacing of the stops; means providing for adjustment of the upper stop to vary the top position of the lever and its stroke to vary the feed increment of the tool; and means for moving the slide, the cross slide, and the lever to move the tool and the stylus together so that the stylus scans the map section by a series of parallel traverses from one side to the other thereof and the tool traverses the model section to slice material therefrom and, with the lever clutched to the tool, to move the latter through a feed increment while the stylus is moved from one contour line to the next in each traverse of the map section.

5. Apparatus as claimed in claim 4 with means responsive to adjustment of the upper stop to indicate the magnitude of the tool feed increment and means for indicating the vertical position of the tool including a scale carried by the slide and a pointer connected to the tool and cooperating with the scale.

6. In apparatus utilizing a rectangular section of a topographic map to produce a contour or relief surface on a like model section of plastic material, a table for supporting a map section and a model section in coordinate relation; a slide; a stylus and a tool carried by the slide for cooperation with the map and model sections; said slide being operable to traverse the stylus and the tool lengthwise and horizontally of the map and model sections; a cross slide for the slide and operable to traverse the stylus and the tool crosswise and horizontally in relation to the map and model sections; a lever hinged to the upper side of the slide; upper and lower stops for limiting the up and down strokes of the lever; gripping means carried by the slide and cooperating with the tool to hold the latter vertically in position; means for clutching the lever to the tool so as to overcome the gripping means, upon movement of the lever, to move the tool with the latter; means manually operable to release the clutch means to provide for movement of the lever relative to the tool to place it in top or bottom position for feeding the tool vertically through an increment which is downward for downstroke motion of the lever and which is upward for upstroke motion thereof and whose magnitude depends upon that of the lever stroke; means for moving the slide, the cross slide, and the lever to move the tool and the stylus together so that the stylus scans the map section by a series of parallel traverses from one side to the other thereof and the tool traverses the model section to slice material therefrom and, with the lever clutched to the tool, to move the latter through a feed increment while the stylus is moved from one contour line to the next in each traverse of the map section; and signal means operable to indicate division of each tool feed increment into a plurality of equal parts to guide the operator in moving the stylus from one contour line to the next while moving the tool through a feed increment.

7. In apparatus utilizing a rectangular section of a topographic map to produce a contour or relief surface on a like model section of plastic material, a table for supporting a map section and a model section in coordinate relation; a slide; a stylus and a tool carried by the slide for cooperation with the map and model sections; said slide being operable to traverse the stylus and the tool lengthwise and horizontally of the map and model sections; a cross slide for the slide and operable to traverse the stylus and the tool crosswise and horizontally in relation to the map and model sections; a lever hinged to the upper side of the slide; upper and lower stops for limiting the up and down strokes of the lever; means providing for adjustment of the upper stop to vary the top position of the lever and the stroke of the latter; gripping means carried by the slide and cooperating with the tool to hold the latter vertically in position; means for clutching the lever to the tool so as to overcome the gripping action, upon movement of the lever, to move the tool with the latter; means manually operable to release the clutch means to provide for movement of the lever relative to the tool to place it in top or bottom position for feeding the tool vertically through an increment which is downward for downstroke motion of the lever and which is upward for upstroke motion thereof and whose magnitude depends upon that of the lever stroke; means for moving the slide, the cross slide, and the lever to move the tool and the stylus together so that the stylus scans the map section by a series of parallel traverses from one side to the other thereof and the tool traverses the model section to slice material therefrom and, with the lever clutched to the tool, to move the latter through a feed increment while the stylus is moved from one contour line to the next in each traverse of the map section; and means adjusted by adjustment of the upper stop and operative to signal division of the feed increment into equal parts irrespective of variation in said feed increment to guide the operator in moving the stylus from one contour line of the map section to the next while moving the tool through the feed increment.

8. In apparatus utilizing a topographic map in the formation of a contour or relief surface on a body, a table for supporting the map and the body; a slide; a stylus and a tool carried by the slide for cooperation with the map and the body; said slide being operable to traverse the stylus and the tool lengthwise and horizontally in relation to the map and the body; a cross slide for the slide, mounted on the table, and operable to traverse the stylus and the tool crosswise and horizontally in relation to the map and the body; a lever disposed above the slide and pivotally connected to the latter; gripping means carried by the slide and cooperating with the tool to hold the latter vertically in position; means for clutching the lever to the tool so as to overcome the gripping means, when the lever is moved, to move the tool with the latter; means manually operable to release the clutch means to provide for movement of the lever relative to the tool to position the lever to feed the tool downwardly or upwardly for an increment dependent upon the elevation difference between adjacent contour lines; adjustable means for varying the top position of the lever to suit a desired ratio of elevation scale to map scale; and means for moving the slide, the cross slide and the lever to move the tool and the stylus together so that the stylus scans the map and, with the lever clutched to the tool, to move the latter through a feed increment while the stylus is moved from one contour line to the next of the map, whereby there is given to the tool the three-dimensional movement required for operation thereof in developing on the body a relief surface with an elevation scale determined by the feed increment.

ROBERT L. BATES.

REFERENCES CITED

The following references are of record in the file of this patent:

UNITED STATES PATENTS

| Number | Name | Date |
|---|---|---|
| 1,393,255 | Wenschow | Oct. 11, 1921 |
| 1,443,624 | Heise | Jan. 30, 1923 |
| 1,907,250 | Shaver | May 2, 1933 |
| 2,149,191 | Stagl | Feb. 28, 1939 |
| 2,177,347 | Sedelmeyer et al. | Oct. 24, 1939 |
| 2,386,816 | Scholz | Oct. 16, 1945 |